(12) United States Patent
Bai

(10) Patent No.: US 10,176,123 B2
(45) Date of Patent: Jan. 8, 2019

(54) COMMUNICATION METHOD AND MOBILE TERMINAL

(71) Applicant: GUANGDONG OPPO MOBILE TELECOMMUNICATIONS CORP., LTD., Dongguan, Guangdong (CN)

(72) Inventor: Jian Bai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 15/802,057

(22) Filed: Nov. 2, 2017

(65) Prior Publication Data

US 2018/0189196 A1    Jul. 5, 2018

(30) Foreign Application Priority Data

Dec. 30, 2016 (CN) .......................... 2016 1 1263318

(51) Int. Cl.
*H04W 4/80* (2018.01)
*G06F 13/10* (2006.01)
(Continued)

(52) U.S. Cl.
CPC ............ *G06F 13/102* (2013.01); *G06F 9/451* (2018.02); *G06N 99/005* (2013.01);
(Continued)

(58) Field of Classification Search
CPC ..... H04W 84/12; H04W 84/18; H04W 76/10; G06F 1/266; G06F 1/3203; G06F 1/325; G06F 3/1431; G06F 3/1438
(Continued)

(56) References Cited

U.S. PATENT DOCUMENTS 8,631,102 B2 * 1/2014 Raleigh ............ G06Q 10/06375
709/221
8,831,655 B2 * 9/2014 Burchill .............. H04W 52/243
455/501

(Continued)

FOREIGN PATENT DOCUMENTS

CN    101677143 A    3/2010
CN    104333648 A    2/2015
(Continued)

OTHER PUBLICATIONS

Supplementary European Search Report in European application No. 17196181.6, dated Jan. 5, 2018.
(Continued)

*Primary Examiner* — Faisal M Zaman
(74) *Attorney, Agent, or Firm* — Ladas & Parry LLP

(57) ABSTRACT

The embodiments of the disclosure disclose a communication method and a mobile terminal. The method includes: when a data communication request sent from a first peripheral device to a second peripheral device is detected, querying whether N peripheral device sets contain a first identifier of the first peripheral device and a second identifier of the second peripheral device, the N peripheral device sets being associated with N communication processors respectively, and each peripheral device set containing an identifier of each peripheral device connected to the corresponding communication processor; and when an $i^{th}$ peripheral device set of the N peripheral device sets contains the first and second identifiers, sending communication link configuration information to the first peripheral device, so as to instruct the first peripheral device to perform data communication with the second peripheral device via an $i^{th}$ communication processor.

18 Claims, 10 Drawing Sheets

(51) Int. Cl.
  *G06F 9/451*   (2018.01)
  *G06N 99/00*   (2010.01)
  *H04L 29/08*   (2006.01)
  *H04M 1/725*   (2006.01)
  *H04W 88/02*   (2009.01)

(52) U.S. Cl.
  CPC ...... *H04L 67/1002* (2013.01); *H04L 67/1008* (2013.01); *H04M 1/72563* (2013.01); *H04W 88/02* (2013.01); *H04W 4/80* (2018.02)

(58) Field of Classification Search
  USPC .... 455/550.1, 553.1, 11.1; 710/14, 303, 316
  See application file for complete search history.

(56)         References Cited

U.S. PATENT DOCUMENTS

| | | | |
|---|---|---|---|
| 2008/0071945 A1 | 3/2008 | Yang | |
| 2009/0059899 A1 | 3/2009 | Bendelac | |
| 2013/0117769 A1* | 5/2013 | Sharma | G06F 1/3293 719/328 |
| 2013/0163469 A1* | 6/2013 | Negron | H04L 12/2807 370/254 |
| 2013/0294358 A1* | 11/2013 | Kim | H04W 72/12 370/329 |
| 2013/0332586 A1* | 12/2013 | Masputra | H04L 69/167 709/220 |
| 2014/0125802 A1* | 5/2014 | Beckert | H04N 7/181 348/148 |
| 2014/0181172 A1* | 6/2014 | Elliott | H04W 28/08 709/201 |
| 2014/0273852 A1* | 9/2014 | McCormack | H04W 76/10 455/41.2 |
| 2014/0370836 A1* | 12/2014 | Gladstone | H04W 4/90 455/404.1 |
| 2015/0003321 A1* | 1/2015 | Burchill | H04L 47/6275 370/328 |
| 2015/0087317 A1* | 3/2015 | Yiu | H04W 76/38 455/441 |
| 2015/0319685 A1* | 11/2015 | Zhao | H04W 40/02 370/329 |
| 2015/0334554 A1* | 11/2015 | Song | H04W 4/70 455/558 |
| 2016/0034411 A1 | 2/2016 | Smith et al. | |
| 2016/0044728 A1 | 2/2016 | Hong et al. | |
| 2016/0342433 A1* | 11/2016 | Rencs | G06F 9/44505 |
| 2017/0019837 A1* | 1/2017 | Katar | H04B 17/318 |
| 2017/0046300 A1* | 2/2017 | Klein | G06F 13/1668 |
| 2018/0004273 A1* | 1/2018 | Leucht-Roth | G06F 1/3215 |
| 2018/0189198 A1* | 7/2018 | Bai | G06F 1/266 |

FOREIGN PATENT DOCUMENTS

| | | |
|---|---|---|
| CN | 106713648 A | 5/2017 |
| WO | 2009044285 A2 | 4/2009 |
| WO | 2016021885 A1 | 2/2016 |

OTHER PUBLICATIONS

International Search Report in international application No. PCT/CN2017/115948, dated Feb. 26, 2018.
English Translation of the Written Opinion of the International Search Authority in international application No. PCT/CN2017/115948, dated Feb. 26, 2018.

* cited by examiner

COMMUNICATION METHOD AND MOBILE TERMINAL

CROSS-REFERENCE TO RELATED APPLICATIONS

This application is filed based upon and claims priority to Chinese Patent Application No. 201611263318.4, entitled "Communication Method and Mobile Terminal", filed on Dec. 30, 2016, the entire contents of which are incorporated herein by reference.

TECHNICAL FIELD

The disclosure relates to the technical field of electronic mobile terminals, and in particular, to a communication method and a mobile terminal.

BACKGROUND

At present, information communications among various peripheral devices inside a mobile terminal are transferred via an Application Processor (AP). For example, a Radio Frequency (RF) module, a Wireless Fidelity (WIFI) module, a power module and a memory module cannot be interconnected, and communications therebetween are transferred via the AP.

For example, when a certain peripheral device needs to communicate with another peripheral device, this peripheral device sends a communication message to an AP, the AP transmits the communication message to the peripheral device to be communicated. Communications between all peripheral devices are transferred via the AP, and therefore burdens on the AP are seriously increased.

SUMMARY

The embodiments of the disclosure provide a communication method and a mobile terminal.

According to a first aspect, an embodiment of the disclosure discloses a communication method. The communication method is applied to a mobile terminal including N communication processors and an AP. The N communication processors are connected to the AP, and each of the N communication processors is connected to at least two peripheral devices of the mobile terminal, N being a positive integer. The communication method includes: when a data communication request sent from a first peripheral device to a second peripheral device is detected, querying whether N peripheral device sets contain a first identifier of the first peripheral device and a second identifier of the second peripheral device, wherein the N peripheral device sets are associated with the N communication processors respectively, and each peripheral device set contains an identifier of each peripheral device connected to the corresponding communication processor; and when it is found out that an $i^{th}$ peripheral device set of the N peripheral device sets contains the first identifier and the second identifier, sending communication link configuration information to the first peripheral device, the communication link configuration information carrying an identifier of an $i^{th}$ communication processor associated with the peripheral device set, and the communication link configuration information being used to instruct the first peripheral device to perform data communication with the second peripheral device via the $i^{th}$ communication processor, where i is a positive integer, and $1 \leq i \leq N$.

According to a second aspect, an embodiment of the disclosure discloses a mobile terminal. The mobile terminal includes N communication processors and an AP. The N communication processors are connected to the AP, and each of the N communication processors is connected to at least two peripheral devices of the mobile terminal, N being a positive integer. The mobile terminal includes: a memory, configured to store instructions readable by one or more processors; and the one or more processors, configured to execute the instructions to implement one or more units. The one or more units include: a Querying unit, configured to query, when a data communication request sent from a first peripheral device to a second peripheral device is detected, whether N peripheral device sets contain a first identifier of the first peripheral device and a second identifier of the second peripheral device, the N peripheral device sets being associated with the N communication processors respectively, and each peripheral device set containing an identifier of each peripheral device connected to the corresponding communication processor; and a sending unit, configured to send, when it is found out that an $i^{th}$ peripheral device set of the N peripheral device sets contains the first identifier and the second identifier, communication link configuration information to the first peripheral device, the communication link configuration information carrying an identifier of an $i^{th}$ communication processor associated with the $i^{th}$ peripheral device set, and the communication link configuration information being used to instruct the first peripheral device to perform data communication with the second peripheral device via the $i^{th}$ communication processor, where i is a positive integer, and $1 \leq i \leq N$.

According to a third aspect, the embodiment of the disclosure discloses a mobile terminal. The mobile terminal includes N communication processors, an AP, M peripheral devices and a bus, wherein the N communication processors are connected to the AP via the bus, and each of the N communication processors is connected to at least two of the M peripheral devices, N being a positive integer, and M being a positive integer greater than 2; and the at least two peripheral devices communicate with each other via the corresponding communication processor.

According to a fourth aspect, the embodiment of the disclosure discloses a mobile terminal. The mobile terminal includes a processor, a memory, a communication interface and a communication bus, wherein the processor, the memory and the communication interface are connected and perform communication via the communication bus; the memory stores an executable program code, and the communication interface is used for wireless communication; and the processor is used to call the executable program code in the memory to execute some or all operations described in any of methods according to the first aspect of the embodiment of the disclosure.

According to a fifth aspect, the embodiment of the disclosure discloses a non-transient computer storage medium, on which computer-readable instructions are stored, the instructions when being executed by a processor, cause the processor to execute the method according to the first aspect of the embodiment of the disclosure.

BRIEF DESCRIPTION OF DRAWINGS

In order to more clearly illustrate the technical solutions in the embodiments of the disclosure or the related art, accompanying drawings needing to be used in the descriptions of the embodiments or the related art will be simply described hereinbelow. Apparently, the drawings described hereinbelow are merely some embodiments of the disclosure. Without making creative works, a person of ordinary skill in the art may also obtain other drawings according to these drawings.

FIG. 2-1 is a diagram illustrating a hardware architecture of a mobile terminal according to an embodiment of the disclosure.

FIG. 6-1 is a block diagram illustrating configurations of units of a mobile terminal according to an embodiment of the disclosure.

FIG. 6-2 is a block diagram illustrating configurations of units of another mobile terminal according to an embodiment of the disclosure.

DETAILED DESCRIPTION

Figure 1:
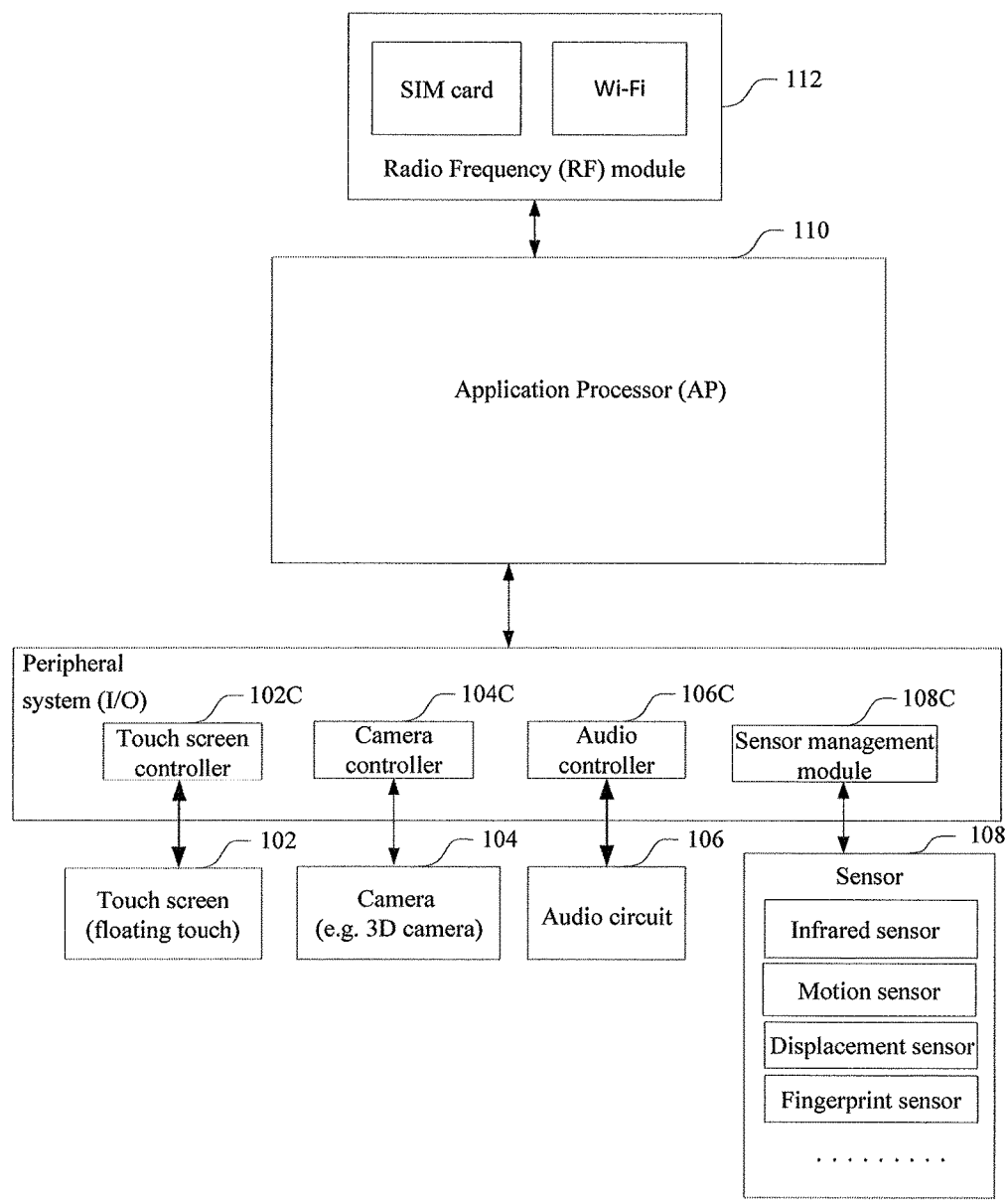
FIG. 1 is a diagram illustrating a hardware architecture of a mobile terminal in the related art.

In order to make a person skilled in the art better understand the solutions of the disclosure, the technical solutions in the embodiments of the disclosure will be clearly and completely described hereinbelow with reference to the drawings in the embodiments of the disclosure. It is apparent that the described embodiments are only a part of the embodiments of the disclosure, not all of the embodiments. On the basis of the embodiments of the disclosure, all other embodiments obtained on the premise of no creative work of a person skilled in the art should fall within the scope of protection of the disclosure.

The terms "first", "second" and the like in specification and claims of the disclosure and the drawings are used for distinguishing different objects rather than describing a specific sequence. In addition, terms "include" and "have" and any inflexions thereof are intended to refer to non-exclusive inclusions. For example, processes, methods, systems, products or devices containing a series of operations or units are not limited to operations or units which have been listed, and other operations or units which are not listed or are inherent to these processes, methods, products or devices are optionally included instead.

Reference to "Embodiments" in the disclosure means that specific features, structures or characteristics described in the embodiments may be included in at least one embodiment of the disclosure. The phrase occurring at each position in the specification does not always refer to the same embodiment, or not an independent or alternative embodiment mutually exclusive to other embodiments. A person skilled in the art explicitly and implicitly understands that the embodiments described in the disclosure may be combined with other embodiments.

The embodiments of the disclosure provide a communication method and a mobile terminal At least some embodiments of the present disclosure provide a communication method, applied to a mobile terminal comprising N communication processors and an Application Processor (AP), the N communication processors being connected to the AP, each of the N communication processors being connected to at least two peripheral devices of the mobile terminal, N being a positive integer, the method comprising: when a data communication request sent from a first peripheral device to a second peripheral device is detected, querying whether N peripheral device sets contain a first identifier of the first peripheral device and a second identifier of the second peripheral device, wherein the N peripheral device sets are associated with the N communication processors respectively, and each peripheral device set contains an identifier of each peripheral device connected to the corresponding communication processor; and when it is found out that an ith peripheral device set of the N peripheral device sets contains the first identifier and the second identifier, sending communication link configuration information to the first peripheral device, the communication link configuration information carrying an identifier of an ith communication processor associated with the ith peripheral device set, and the communication link configuration information being used to instruct the first peripheral device to perform data communication with the second peripheral device via the ith communication processor, where i is a positive integer, and $1 \leq i \leq N$.

According to at least some embodiments, the method further comprises: acquiring resource occupancy information about each of the N communication processors; and adjusting at least two peripheral devices connected to each of at least some of the N communication processors according to the resource occupancy information on the basis of a load balancing principle, so as to achieve load balancing of the N communication processors via the adjustment.

According to at least some embodiments, the adjusting at least two peripheral devices connected to each of at least some of the N communication processors according to the resource occupancy information on the basis of a load balancing principle so as to achieve load balancing of the N communication processors via the adjustment comprises: when the resource occupancy information indicates that resource occupancy of a first communication processor of the N communication processors is higher than resource occupancy of other communication processors of the N communication processors, changing connection of one or more of at least two peripheral devices to the first communication processor into connection to other communication processors of the N communication processors on the basis of the load balancing principle.

According to at least some embodiments, the adjusting at least two peripheral devices connected to each of at least some of the N communication processors according to the resource occupancy information on the basis of a load balancing principle so as to achieve load balancing of the N communication processors via the adjustment comprises: when the resource occupancy information indicates that resource occupancy of a second communication processor of the N communication processors is lower than resource occupancy of other communication processors of the N communication processors, changing connection of one or more of at least two peripheral devices to the other communication processors into connection to the second communication processor on the basis of the load balancing principle.

According to at least some embodiments, the method further comprises: determining a high-frequency usage time period of a target peripheral device; and when it is detected that a current time falls within the high-frequency usage time period of the target peripheral device, configuring the target peripheral device with a target communication processor, processing capacity of the target communication processor being higher than processing capacities of other processors, except the target communication processor, of the N communication processors.

According to at least some embodiments, the determining a high-frequency usage time period of a target peripheral device comprises: acquiring usage information about a target peripheral device within a preset time period; and determining the high-frequency usage time period of the target peripheral device according to the usage information about the target peripheral device within the preset time period.

According to at least some embodiments, the determining a high-frequency usage time period of a target peripheral device comprises: performing machine learning on the usage information about the target peripheral device within the preset time period, so as to make statistics on the high-frequency usage time period of the target peripheral device.

According to at least some embodiments, the method further comprises: displaying a visual interactive interface on a display screen of the mobile terminal, the visual interactive interface being used to set a communication mode for peripheral devices, the visual interactive interface comprising identifiers of at least two peripheral devices of the mobile terminal and identifiers of the N communication processors; acquiring an identifier of a communication processor and an identifier of a peripheral device selected by a user; and adding the identifier of the selected peripheral device into a peripheral device set associated with the selected communication processor.

According to at least some embodiments, the at least two peripheral devices are at least two components selected from a group consisting of a Radio Frequency (RF) module, a Wireless Fidelity (WIFI) module, a power supply, a memory, a camera, a touch screen, an audio playing module, a sensor and a display screen.

At least some embodiments of the present disclosure provide a mobile terminal, comprising: N communication processors and an Application Processor (AP), the N communication processors being connected to the AP, each of the N communication processors being connected to at least two peripheral devices of the mobile terminal, N being a positive integer, the mobile terminal comprising: a memory, configured to store instructions readable by one or more processors; and the one or more processors, configured to execute the instructions to implement one or more units, the one or more units comprising: a Querying unit, configured to query, when a data communication request sent from a first peripheral device to a second peripheral device is detected, whether N peripheral device sets contain a first identifier of the first peripheral device and a second identifier of the second peripheral device, the N peripheral device sets being associated with the N communication processors respectively, and each peripheral device set containing an identifier of each peripheral device connected to the corresponding communication processor; and a sending unit, configured to send, when it is found out that an ith peripheral device set of the N peripheral device sets contains the first identifier and the second identifier, communication link configuration information to the first peripheral device, the communication link configuration information carrying an identifier of an ith communication processor associated with the ith peripheral device set, and the communication link configuration information being used to instruct the first peripheral device to perform data communication with the second peripheral device via the ith communication processor, where i is a positive integer, and $1 \le i \le N$.

According to at least some embodiments, the one or more processors are further configured to execute the instructions to implement: a first acquisition unit, configured to acquire resource occupancy information about each of the N communication processors; and a first configuration unit, configured to adjust at least two peripheral devices connected to each of at least some of the N communication processors according to the resource occupancy information on the basis of a load balancing principle, so as to achieve load balancing of the N communication processors via the adjustment.

According to at least some embodiments, the first configuration unit is configured to: change, when the resource occupancy information indicates that resource occupancy of a first communication processor of the N communication processors is higher than resource occupancy of other communication processors of the N communication processors, connection of one or more of at least two peripheral devices to the first communication processor into connection to other communication processors of the N communication processors on the basis of the load balancing principle.

According to at least some embodiments, the first configuration unit is configured to: change, when the resource occupancy information indicates that resource occupancy of a second communication processor of the N communication processors is lower than resource occupancy of other communication processors of the N communication processors, connection of one or more of at least two peripheral devices to the other communication processors into connection to the second communication processor on the basis of the load balancing principle.

According to at least some embodiments, the one or more processors are further configured to execute the instructions to implement: a determination unit, configured to determine a high-frequency usage time period of a target peripheral device; and a second configuration unit, configured to configure, when it is detected that a current time falls within the high-frequency usage time period of the target peripheral device, the target peripheral device with a target communication processor, processing capacity of the target communication processor being higher than processing capacities of other processors, except the target communication processor, of the N communication processors.

According to at least some embodiments, the one or more processors are further configured to execute the instructions to implement: a first acquisition unit, configured to acquire usage information about a target peripheral device within a preset time period, wherein the determination unit is configured to determine the high-frequency usage time period of the target peripheral device according to the usage information about the target peripheral device within the preset time period.

According to at least some embodiments, the first acquisition unit is configured to perform machine learning on the usage information about the target peripheral device within the preset time period; and the determination unit is configured to make statistics on the high-frequency usage time period of the target peripheral device according to a result of the machine learning.

According to at least some embodiments, the one or more processors are further configured to execute the instructions to implement: a display unit, configured to display a visual interactive interface on a display screen of the mobile terminal, the visual interactive interface being used to set a communication mode for peripheral devices, the visual interactive interface comprising identifiers of at least two peripheral devices of the mobile terminal and identifiers of the N communication processors; a third acquisition unit, configured to acquire an identifier of a communication processor and an identifier of a peripheral device selected by a user; and a third configuration unit, configured to add the identifier of the selected peripheral device into a peripheral device set associated with the selected communication processor.

According to at least some embodiments, the at least two peripheral devices are at least two components selected from a group consisting of a Radio Frequency (RF) module, a Wireless Fidelity (WIFI) module, a power supply, a memory, a camera, a touch screen, an audio playing module, a sensor and a display screen.

At least some embodiments of the disclosure provide a mobile terminal, comprising: N communication processors, an Application Processor (AP), M peripheral devices and a bus, wherein the N communication processors are connected to the AP via the bus, and each of the N communication processors is connected to at least two of the M peripheral devices, N being a positive integer, and M being a positive integer greater than 2; and the at least two peripheral devices communicate with each other via the corresponding communication processor.

At least some embodiments of the disclosure provide a mobile terminal. The mobile terminal includes a processor, a memory, a communication interface and a communication bus, wherein the processor, the memory and the communication interface are connected and perform communication via the communication bus; the memory stores an executable program code, and the communication interface is used for wireless communication; and the processor is used to call the executable program code in the memory to execute some or all operations described in any of methods according to the first aspect of the embodiment of the disclosure.

At least some embodiments of the disclosure provide a non-transient computer storage medium, on which computer-readable instructions are stored, the instructions when being executed by a processor, cause the processor to execute the method according to the first aspect of the embodiment of the disclosure.

A mobile terminal described in the embodiments of the disclosure may include a smart phone (such as an Android phone, an iOS phone and a Windows Phone), a tablet computer, a palmtop, a laptop, Mobile Internet Devices (MID) or a wearable device. The terminals are only exemplary, not exhaustive, and the mobile terminal includes, but is not limited to the terminals.

In order to better understand a communication method and a mobile terminal disclosed in the embodiments of the disclosure, the communication method and the mobile terminal provided in the embodiments of the disclosure will be described in detail hereinbelow with reference to FIG. 1 to FIG. 8.

FIG. 1 is a diagram illustrating a hardware architecture of a terminal according to the related art. As illustrated in FIG. 1, a hardware architecture according to the related art includes an AP 110 and a peripheral system. The peripheral system includes a plurality of peripheral devices such as a touch screen 102, a camera 104, an audio circuit 106, a sensor 108 and an RF module 112, as well as a touch screen controller 102C, a camera controller 104C, an audio controller 106C and a sensor management module 108C.

Each of the peripheral devices is connected to the AP 110. When a peripheral device needs to communicate with another peripheral device, the peripheral device sends a communication request to the AP 110. The AP 110 analyzes the communication request to determine a target peripheral device corresponding to the communication request. Then, the AP 110 forwards the communication request to the target peripheral device for being processed. Alternatively, the communication request is intended to acquire data from the target peripheral device, or control the target peripheral device to execute corresponding operations and the like.

It can thus be seen that in the related art, communications between all peripheral devices need to be transferred via an AP, thereby greatly increasing loads on the AP.

Figure 2:
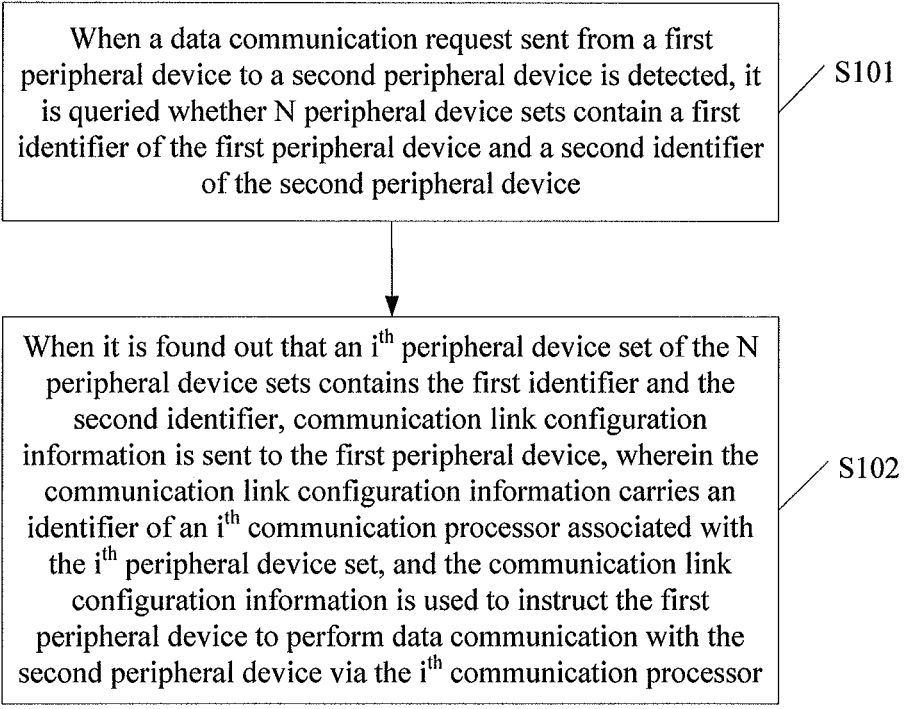
FIG. 2 is a flowchart illustrating a communication method according to an embodiment of the disclosure.
Figures 1, 2:
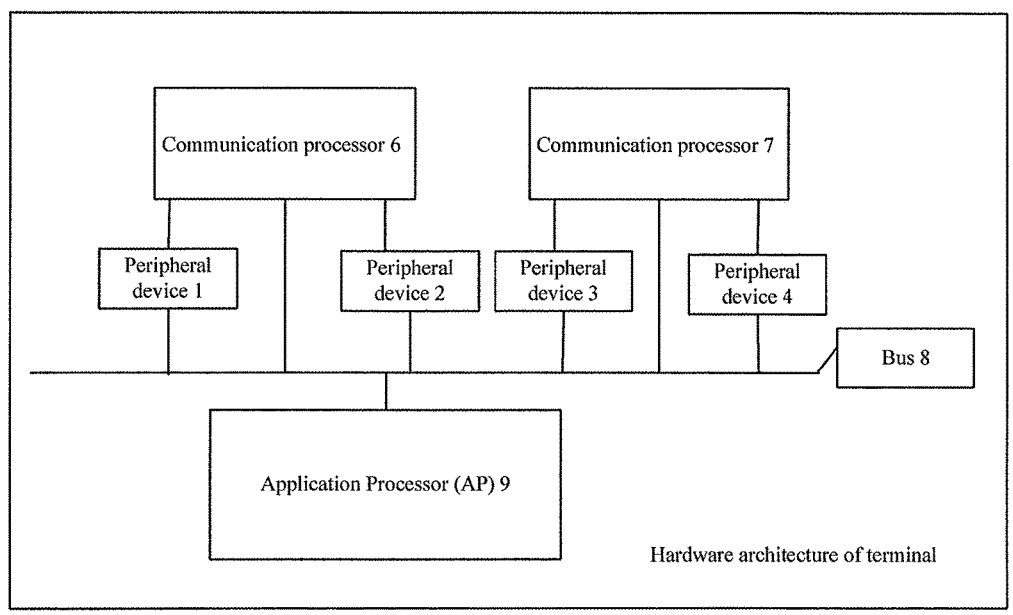

FIG. 2 is a flowchart illustrating a communication method according to an embodiment of the disclosure. The communication method according to the embodiment of the disclosure may be applied to a mobile terminal including N communication processors and an AP. The N communication processors are connected to the AP. Each of the N communication processors is connected to at least two peripheral devices of the mobile terminal. N is a positive integer. As illustrated in FIG. 2, the communication method in the embodiment of the disclosure includes the operations as illustrated in the following blocks.

In block S101, when a data communication request sent from a first peripheral device to a second peripheral device is detected, it is queried whether N peripheral device sets contain a first identifier of the first peripheral device and a second identifier of the second peripheral device. The N peripheral device sets are associated with the N communication processors respectively. In addition, each peripheral device set contains an identifier of each peripheral device connected to the corresponding communication processor.

Here, when the AP detects the data communication request sent from the first peripheral device to the second peripheral device, the first peripheral device does not have communication link configuration information. Thus, the operation that the AP detects the data communication request sent from the first peripheral device to the second peripheral device only refers to that: the first peripheral device sends the data communication request to the second peripheral device but the data communication request does not reach the second peripheral device.

Herein, the at least two peripheral devices may include, but not limited to, an RF module, a WIFI module, a power supply, a memory, a camera, a touch screen, an audio playing module, a sensor and a display screen, for example.

The mobile terminal in the embodiment of the disclosure may include N communication processors, an AP, M peripheral devices and a bus. The N communication processors are connected to the AP via the bus. Each of the N communication processors is connected to at least two of the M peripheral devices. N is a positive integer, and M is a positive integer greater than 2. Here, the at least two peripheral devices communicate with each other via the corresponding communication processor. As illustrated in FIG. 2-1, the hardware architecture of the mobile terminal according to an embodiment of the disclosure is illustrated with four peripheral devices. Certainly, the four peripheral devices here are only taken as an example, and the quantity of the peripheral devices may be another number. A peripheral device 1 and a peripheral device 2 are connected to a communication processor 6 and form a first peripheral device set. The first peripheral device set is associated with the communication processor 6. A peripheral device 3 and a peripheral device 4 are connected to a communication processor 7 and form a second peripheral device set. The second peripheral device set is associated with the communication processor 7. Both the communication processor 6 and the communication processor 7 are connected with a bus 8. The peripheral device 1, the peripheral device 2, the peripheral device 3, the peripheral device 4 and an AP 9 are connected with the bus respectively.

In block S102, when it is found out that an $i^{th}$ peripheral device set of the N peripheral device sets contains the first identifier and the second identifier, communication link configuration information is sent to the first peripheral device. The communication link configuration information carries an identifier of an $i^{th}$ communication processor associated with the $i^{th}$ peripheral device set, where i is a positive integer, and $1 \leq i \leq N$. Here, the communication link configuration information is used to instruct the first peripheral device to perform data communication with the second peripheral device via the $i^{th}$ communication processor.

Specifically, as illustrated in FIG. 2-1, all peripheral devices in a peripheral device set may communicate via a corresponding communication processor. For example, a peripheral device 1 needs to communicate with a peripheral device 2. When it is found out that a first peripheral device set of two peripheral device sets includes a first identifier of the peripheral device 1 and a second identifier of the peripheral device 2, an AP 9 of the mobile terminal sends communication link configuration information to the peripheral device 1. The communication link configuration information carries an identifier of a communication processor 6 associated with the first peripheral device set, such that the peripheral device 1 sends an access instruction to the peripheral device 2 via the communication processor 6 and a bus 8. The access instruction may be a data instruction or a control instruction. After receiving the access instruction, the peripheral device 2 executes an operation corresponding to the access instruction.

It can be seen that the communication method provided in the embodiment of the disclosure is applied to a mobile terminal including N communication processors and an AP. The N communication processors are connected to the AP. Each of the N communication processors is connected to at least two peripheral devices of the mobile terminal. When a data communication request sent from a first peripheral device to a second peripheral device is detected, it is queried whether N peripheral device sets contain a first identifier of the first peripheral device and a second identifier of the second peripheral device. The N peripheral device sets are associated with the N communication processors respectively, and each peripheral device set contains an identifier of each peripheral device connected to the corresponding communication processor. When it is found out that an $i^{th}$ peripheral device set of the N peripheral device sets contains the first identifier and the second identifier, communication link configuration information carrying an identifier of an $i^{th}$ communication processor associated with the $i^{th}$ peripheral device set is sent to the first peripheral device, so as to instruct the first peripheral device to perform data communication with the second peripheral device via the $i^{th}$ communication processor. As can be seen, a first peripheral device and a second peripheral device located in the same peripheral device set may communicate on the basis of a communication processor associated with the peripheral device set, thereby eliminating a necessity of transferring between all peripheral devices, alleviating burdens on an AP and improving the communication efficiency.

Optionally, the mobile terminal may also execute the following operations. For example, the mobile terminal acquires resource occupancy information about the N communication processors. For example, the mobile terminal adjusts at least two peripheral devices connected to each of at least some of the N communication processors according to the resource occupancy information on the basis of a load balancing principle, so as to achieve load balancing of the N communication processors via the adjustment.

For example, as illustrated in FIG. 2-1, resource occupancy information about a communication processor 6 and resource occupancy information about a communication processor 7 may be acquired by the mobile terminal, and are 20% and 80%, respectively. The mobile terminal may dynamically adjust a peripheral device connected to the communication processor 6 and a peripheral device connected to the communication processor 7. For example, connection of a peripheral device 3 to the communication processor 7 may be changed into connection to the communication processor 6, so as to reduce resource occupancy of the communication processor 7.

Optionally, the mobile terminal may also execute the following operations. For example, the mobile terminal may acquire usage information about a target peripheral device within a preset time period. Then, the mobile terminal may determine a high-frequency usage time period of the target peripheral device according to the usage information about the target peripheral device within the preset time period. Then, when detecting that a current time falls within the high-frequency usage time period of the target peripheral device, the mobile terminal may configure the target peripheral device with a target communication processor. The processing capacity of the target communication processor is higher than that of other processors, except the target communication processor, of the N communication processors.

For example, the mobile terminal may perform machine learning on the usage information about the target peripheral device within the preset time period, so as to make statistics on the high-frequency usage time period of the target peripheral device.

Alternatively, the mobile terminal may also execute the following operations. For example, the mobile terminal may display a visual interactive interface on a display screen of the mobile terminal. The visual interactive interface may be used to set a communication mode for peripheral devices. The visual interactive interface may include identifiers of at least two peripheral devices of the mobile terminal and identifiers of the N communication processors. Then, the mobile terminal may acquire an identifier of a communication processor and an identifier of a peripheral device selected by a user. Then, the mobile terminal adds the identifier of the selected peripheral device into a peripheral device set associated with the selected communication processor.

As can be seen, the mobile terminal guides a user to self-configure a preset communication processor for a peripheral device by providing a visual interactive interface, such that the user may directly participate in a resource configuration process. Thus increase of participation of the user is facilitated, and the user viscosity is improved.

Figure 3:
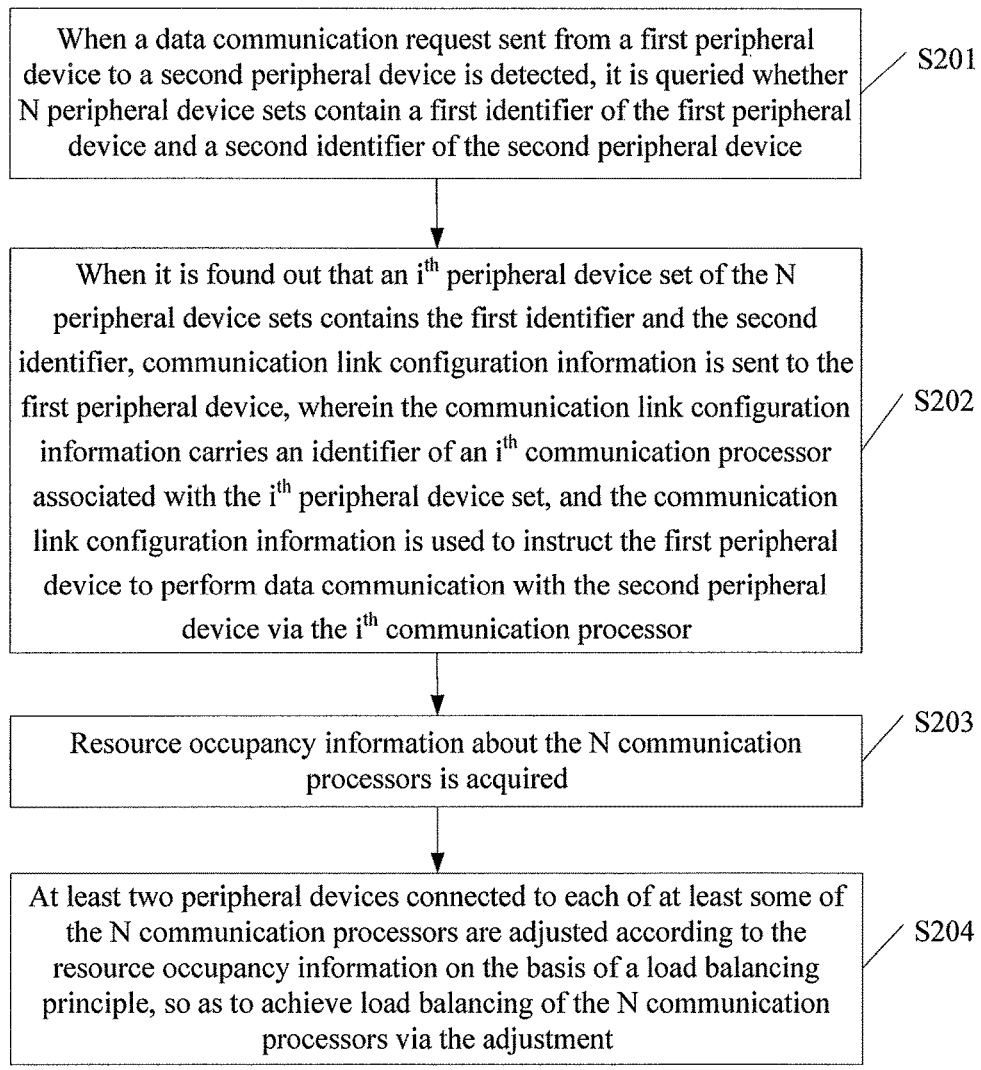
FIG. 3 is a flowchart illustrating another communication method according to an embodiment of the disclosure.

FIG. 3 is a flowchart illustrating a communication method according to an embodiment of the disclosure. The communication method in the embodiment of the disclosure may be applied to a mobile terminal including N communication processors and an AP. The N communication processors are connected to the AP. Each of the N communication processors is connected to at least two peripheral devices of the mobile terminal. N is a positive integer. As illustrated in FIG. 3, the communication method in the embodiment of the disclosure includes the operations as illustrated in the following blocks.

In block S201, when a data communication request sent from a first peripheral device to a second peripheral device is detected, it is queried whether N peripheral device sets contain a first identifier of the first peripheral device and a second identifier of the second peripheral device. The N peripheral device sets are associated with the N communication processors respectively, and each peripheral device set contains an identifier of each peripheral device connected to the corresponding communication processor.

Herein, the at least two peripheral devices may include, but are not limited to, an RF module, a WIFI module, a power supply, a memory, a camera, a touch screen, an audio playing module, a sensor and a display screen.

In block S202, when it is found out that an $i^{th}$ peripheral device set of the N peripheral device sets contains the first identifier and the second identifier, communication link configuration information is sent to the first peripheral device, where i is a positive integer, and $1 \le i \le N$. The communication link configuration information carries an identifier of an $i^{th}$ communication processor associated with the $i^{th}$ peripheral device set. The communication link configuration information is used to instruct the first peripheral device to perform data communication with the second peripheral device via the $i^{th}$ communication processor.

In block S203, resource occupancy information about the N communication processors is acquired.

In block S204, at least two peripheral devices connected to each communication processor are adjusted according to the resource occupancy information on the basis of a load balancing principle, so as to achieve load balancing of the N communication processors via the adjustment.

For example, when the resource occupancy information indicates that resource occupancy of a first communication processor of the N communication processors is higher than resource occupancy of other communication processors of the N communication processors, connection of one or more of at least two peripheral devices to the first communication processor is changed into connection to other communication processors of the N communication processors on the basis of the load balancing principle.

It can be seen that the communication method provided in the embodiment of the disclosure is applied to a mobile terminal including N communication processors and an AP. The N communication processors are connected to the AP. Each of the N communication processors is connected to at least two peripheral devices. When a data communication request sent from a first peripheral device to a second peripheral device is detected, it is queried whether N peripheral device sets contain a first identifier of the first peripheral device and a second identifier of the second peripheral device. The N peripheral device sets are associated with the N communication processors respectively, and each peripheral device set contains an identifier of each peripheral device connected to the corresponding communication processor. When it is found out that an $i^{th}$ peripheral device set of the N peripheral device sets contain the first identifier and the second identifier, communication link configuration information carrying an identifier of an $i^{th}$ communication processor associated with the $i^{th}$ peripheral device set is sent to the first peripheral device, so as to instruct the first peripheral device to perform data communication with the second peripheral device via the $i^{th}$ communication processor. As can be seen, a first peripheral device and a second peripheral device located in the same peripheral device set may communicate on the basis of a communication processor associated with the peripheral device set, thereby eliminating a necessity of transferring between all peripheral devices, alleviating burdens on an AP and improving the communication efficiency.

Figure 4:
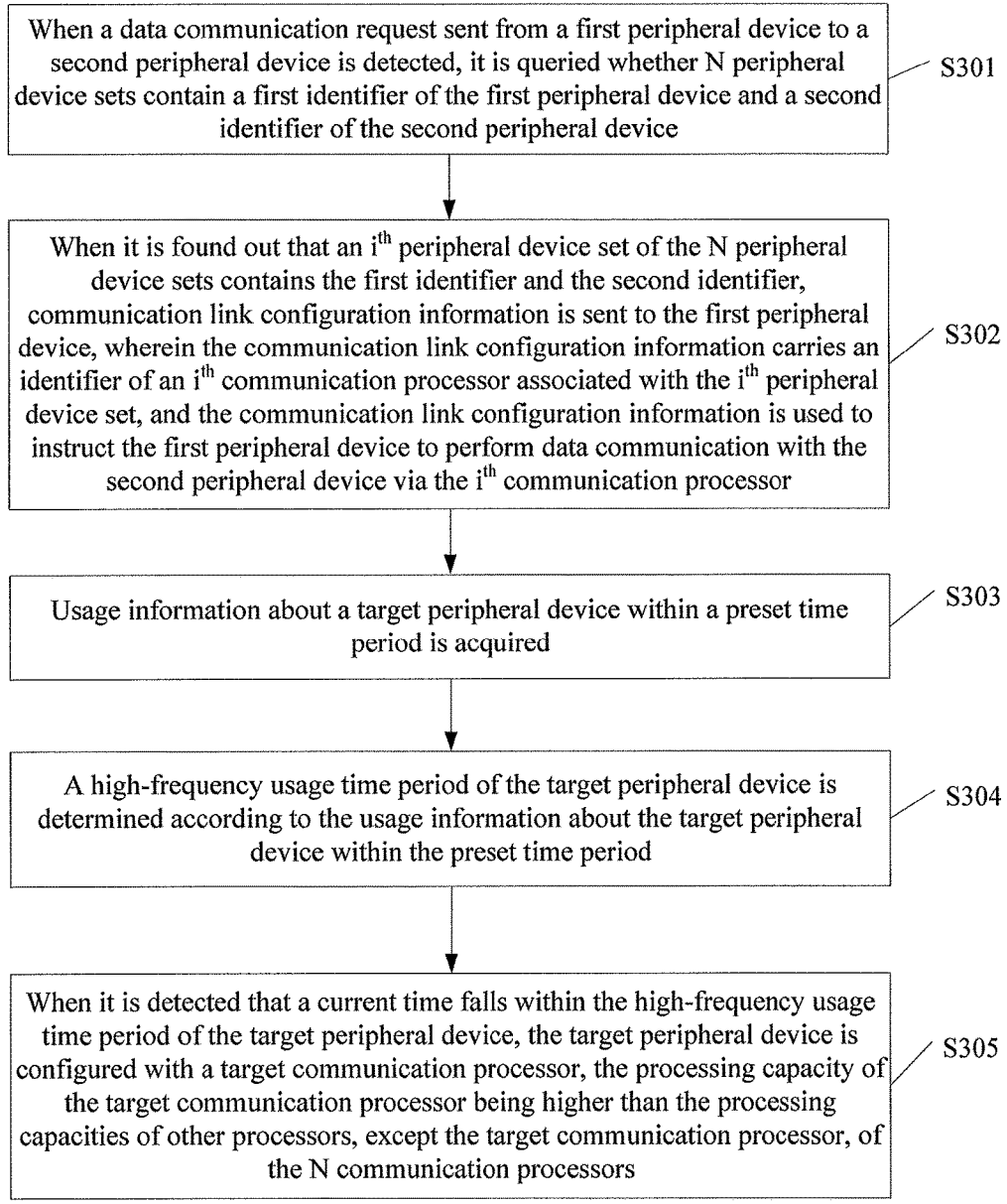
FIG. 4 is a flowchart illustrating another communication method according to an embodiment of the disclosure.

FIG. 4 is a flowchart illustrating a communication method according to an embodiment of the disclosure. The communication method in the embodiment of the disclosure may be applied to a mobile terminal including N communication processors and an AP. The N communication processors are connected to the AP. Each of the N communication processors is connected to at least two peripheral devices of the mobile terminal. N is a positive integer. As illustrated in FIG. 4, the communication method in the embodiment of the disclosure includes the operations as illustrated in the following blocks.

In block S301, when a data communication request sent from a first peripheral device to a second peripheral device is detected, it is queried whether N peripheral device sets contain a first identifier of the first peripheral device and a second identifier of the second peripheral device. The N peripheral device sets are associated with the N communication processors respectively, and each peripheral device set contains an identifier of each peripheral device connected to the corresponding communication processor.

Herein, the at least two peripheral devices may include, but are not limited to, an RF module, a WIFI module, a power supply, a memory, a camera, a touch screen, an audio playing module, a sensor and a display screen.

In block S302, when it is found out that an $i^{th}$ peripheral device set of the N peripheral device sets contains the first identifier and the second identifier, communication link configuration information is sent to the first peripheral device, where i is a positive integer, and $1 \le i \le N$. The communication link configuration information carries an identifier of an $i^{th}$ communication processor associated with the $i^{th}$ peripheral device set. The communication link configuration information is used to instruct the first peripheral device to perform data communication with the second peripheral device via the $i^{th}$ communication processor.

In block S303, usage information about a target peripheral device within a preset time period is acquired.

In block S304, a high-frequency usage time period of the target peripheral device is determined according to the usage information about the target peripheral device within the preset time period.

In block S305, when it is detected that a current time falls within the high-frequency usage time period of the target peripheral device, the target peripheral device is configured with a target communication processor. The processing capacity of the target communication processor is higher than that of other processors, except the target communication processor, of the N communication processors.

It can be seen that the communication method provided in the embodiment of the disclosure is applied to a mobile terminal including N communication processors and an AP. The N communication processors are connected to the AP. Each of the N communication processors is connected to at least two peripheral devices. When a data communication request sent from a first peripheral device to a second peripheral device is detected, it is queried whether N peripheral device sets contain a first identifier of the first peripheral device and a second identifier of the second peripheral device. The N peripheral device sets are associated with the N communication processors respectively, and each peripheral device set contains an identifier of each peripheral device connected to the corresponding communication processor. When it is found out that an $i^{th}$ peripheral device set of the N peripheral device sets contains the first identifier and the second identifier, communication link configuration information carrying an identifier of an $i^{th}$ communication processor associated with the $i^{th}$ peripheral device set is sent to the first peripheral device, so as to instruct the first peripheral device to perform data communication with the second peripheral device via the $i^{th}$ communication processor. As can be seen, a first peripheral device and a second peripheral device located in the same peripheral device set may communicate on the basis of a communication processor associated with the peripheral device set, thereby eliminating a necessity of transferring between all peripheral devices, alleviating burdens on an AP and improving the communication efficiency.

Figure 5:
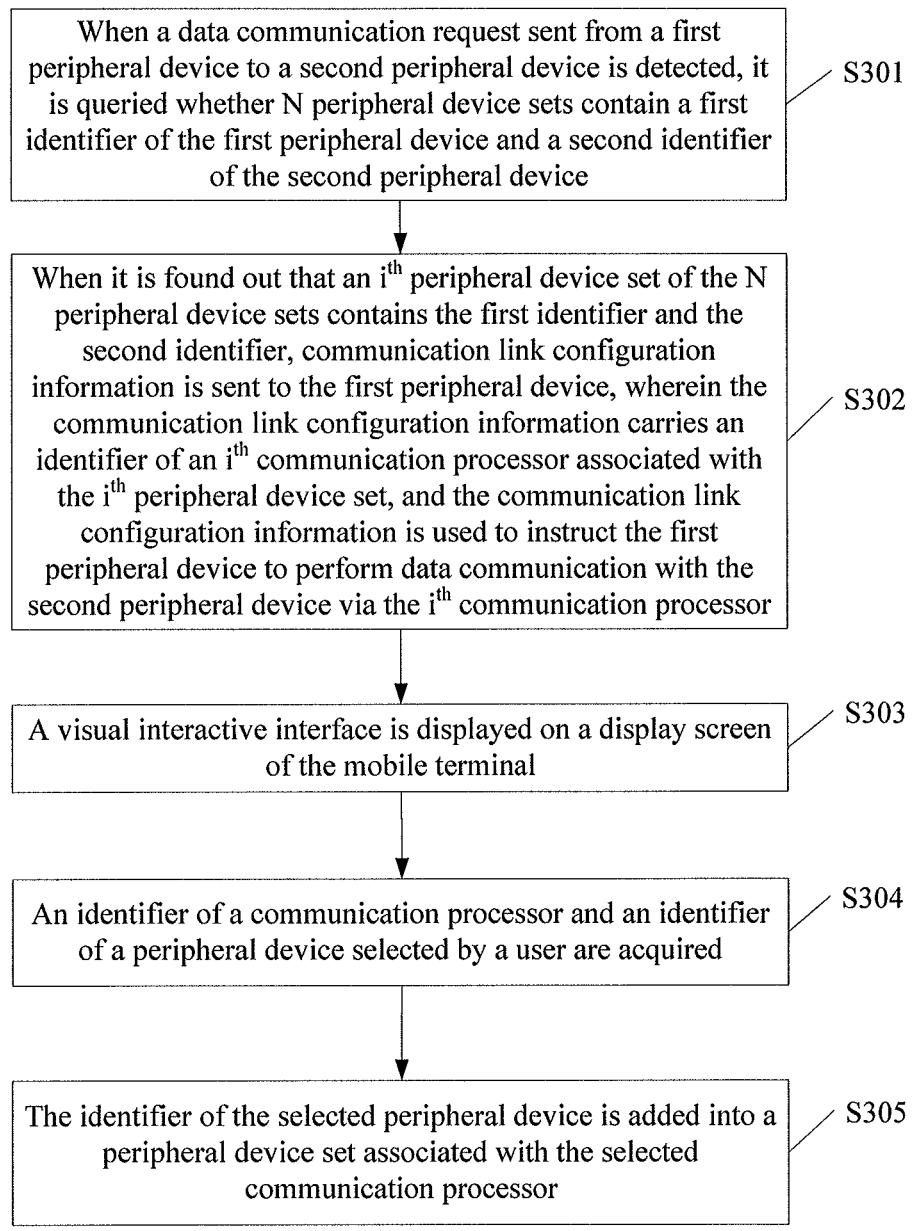
FIG. 5 is a flowchart illustrating another communication method according to an embodiment of the disclosure.

FIG. 5 is a flowchart illustrating a communication method according to an embodiment of the disclosure. The communication method in the embodiment of the disclosure may be applied to a mobile terminal including N communication processors and an AP. The N communication processors are connected to the AP. Each of the N communication processors is connected to at least two peripheral devices of the mobile terminal. N is a positive integer. As illustrated in FIG. 5, the communication method in the embodiment of the disclosure includes the operations as illustrated in the following blocks.

In block S401, when a data communication request sent from a first peripheral device to a second peripheral device is detected, it is queried whether N peripheral device sets contain a first identifier of the first peripheral device and a second identifier of the second peripheral device. The N peripheral device sets are associated with the N communication processors respectively, and each peripheral device set contains an identifier of each peripheral device connected to the corresponding communication processor.

Here, the at least two peripheral devices may include, but are not limited to, an RF module, a WIFI module, a power supply, a memory, a camera, a touch screen, an audio playing module, a sensor and a display screen.

In block S402, when it is found out that an $i^{th}$ peripheral device set of the N peripheral device sets contains the first identifier and the second identifier, communication link configuration information is sent to the first peripheral device, where i is a positive integer, and $1 \leq i \leq N$. The communication link configuration information carries an identifier of an $i^{th}$ communication processor associated with the $i^{th}$ peripheral device set. The communication link configuration information is used to instruct the first peripheral device to perform data communication with the second peripheral device via the $i^{th}$ communication processor.

In block S403, a visual interactive interface is displayed on a display screen of the mobile terminal. The visual interactive interface is used to set a communication mode for peripheral devices. The visual interactive interface includes identifiers of at least two peripheral devices of the mobile terminal and identifiers of the N communication processors.

In block S404, an identifier of a communication processor and an identifier of a peripheral device selected by a user are acquired.

In block S405, the identifier of the selected peripheral device is added into a peripheral device set associated with the selected communication processor.

It can be seen that the communication method provided in the embodiment of the disclosure is applied to a mobile terminal including N communication processors and an AP. The N communication processors are connected to the AP. Each of the N communication processors is connected to at least two peripheral devices. When a data communication request sent from a first peripheral device to a second peripheral device is detected, it is queried whether N peripheral device sets contain a first identifier of the first peripheral device and a second identifier of the second peripheral device. The N peripheral device sets are associated with the N communication processors respectively, and each peripheral device set contains an identifier of each peripheral device connected to the corresponding communication processor. When it is found out that an $i^{th}$ peripheral device set of the N peripheral device sets contains the first identifier and the second identifier, communication link configuration information carrying an identifier of an $i^{th}$ communication processor associated with the $i^{th}$ peripheral device set is sent to the first peripheral device, so as to instruct the first peripheral device to perform data communication with the second peripheral device via the $i^{th}$ communication processor. As can be seen, a first peripheral device and a second peripheral device located in the same peripheral device set may communicate on the basis of a communication processor associated with the peripheral device set, thereby eliminating a necessity of transferring between all peripheral devices, alleviating burdens on an AP and improving the communication efficiency.

Figures 1, 6:
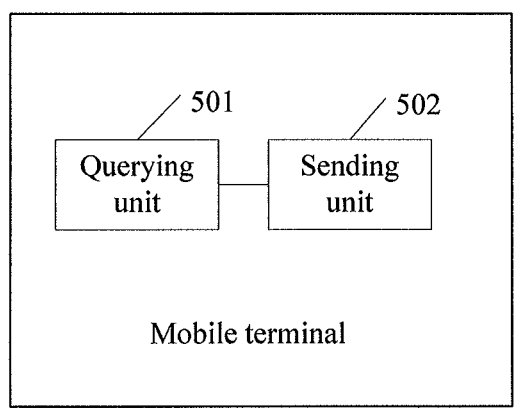
Figures 2, 6:
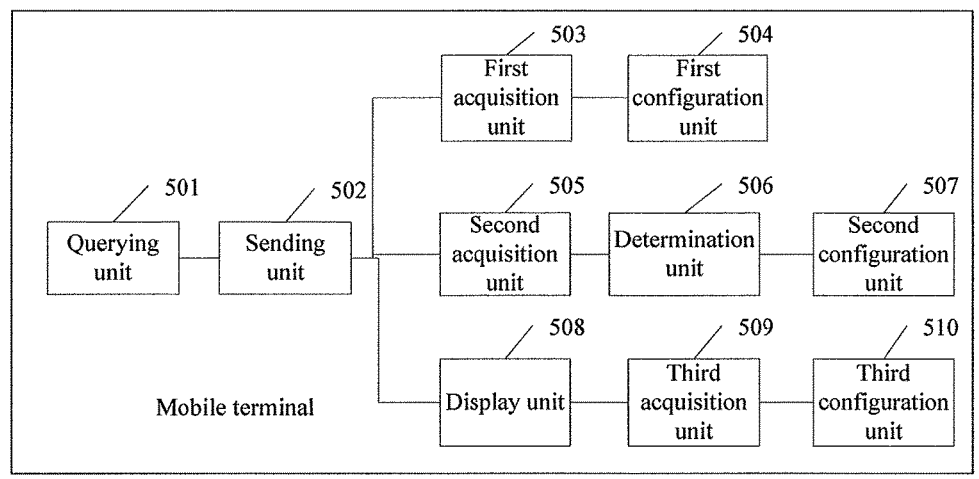

The apparatus embodiment of the disclosure is illustrated hereinbelow. The apparatus embodiment of the disclosure may be used to execute the method implemented in the method embodiment of the disclosure. FIG. 6-1 is a block diagram illustrating configurations of units of a mobile terminal according to an embodiment of the disclosure. The mobile terminal includes N communication processors and an AP. The N communication processors are connected to the AP. Each of the N communication processors is connected to at least two peripheral devices of the mobile terminal. N is a positive integer. As illustrated in FIG. 6-1, the mobile terminal may include a Querying unit 501 and a sending unit 502.

The Querying unit 501 is configured to query, when a data communication request sent from a first peripheral device to a second peripheral device is detected, whether N peripheral device sets contain a first identifier of the first peripheral device and a second identifier of the second peripheral device. The N peripheral device sets are associated with the N communication processors respectively, and each peripheral device set contains an identifier of each peripheral device connected to the corresponding communication processor.

The sending unit 502 is configured to send, when it is found out that an $i^{th}$ peripheral device set of the N peripheral device sets contains the first identifier and the second identifier, communication link configuration information to the first peripheral device, where i is a positive integer, and $1 \leq i \leq N$. The communication link configuration information carries an identifier of an $i^{th}$ communication processor associated with the $i^{th}$ peripheral device set. The communication link configuration information is used to instruct the first peripheral device to perform data communication with the second peripheral device via the $i^{th}$ communication processor.

FIG. 6-2 is a block diagram illustrating configurations of units of another mobile terminal according to an embodiment of the disclosure. As illustrated in FIG. 6-2, the mobile terminal may include the Querying unit 501 and the sending unit 502 in the embodiment corresponding to FIG. 6-1.

Optionally, the mobile terminal may further include a first acquisition unit 503 and a first configuration unit 504.

The first acquisition unit 503 may be configured to acquire resource occupancy information about each of the N communication processors.

The first configuration unit 504 may be configured to adjust at least two peripheral devices connected to each of at least some of the N communication processors according to the resource occupancy information on the basis of a load balancing principle, so as to achieve load balancing of the N communication processors via the adjustment.

Optionally, the mobile terminal may further include a second acquisition unit 505, a determination unit 506 and a second configuration unit 507.

The second acquisition unit 505 may be configured to acquire usage information about a target peripheral device within a preset time period.

The determination unit 506 may be configured to determine a high-frequency usage time period of the target peripheral device according to the usage information about the target peripheral device within the preset time period.

The second configuration unit 507 may be configured to configure, when it is detected that a current time falls within the high-frequency usage time period of the target peripheral device, the target peripheral device with a target communication processor. The processing capacity of the target communication processor is higher than that of other processors, except the target communication processor, of the N communication processors.

Optionally, the mobile terminal may further include a display unit 508, a third acquisition unit 509 and a third configuration unit 510.

The display unit 508 may be configured to display a visual interactive interface on a display screen of the mobile terminal. The visual interactive interface is used to set a communication mode for peripheral devices. The visual interactive interface includes identifiers of at least two peripheral devices of the mobile terminal and identifiers of the N communication processors.

The third acquisition unit 509 may be configured to acquire an identifier of a communication processor and an identifier of a peripheral device selected by a user.

The third configuration unit 510 may be configured to add the identifier of the selected peripheral device into a peripheral device set associated with the selected communication processor.

Optionally, the at least two peripheral devices may include, but are not limited to, an RF module, a WIFI module, a power supply, a memory, a camera, a touch screen, an audio playing module, a sensor and a display screen.

Specifically, for specific implementation of various units as described above, reference may be made to the description of relevant operations in the embodiments corresponding to FIGS. 2 to 5, and detailed description will not be made herein.

It is to be noted that the mobile terminal described in the apparatus embodiment of the disclosure is presented in a form of function unit. The term "unit" used here should be interpreted as a meaning as wide as possible. An object for implementing functions described by each "unit" may be, for example, an Application Specific Integrated Circuit (ASIC), a single circuit, a processor (shared, dedicated or chip group) for executing one or more software or firmware programs and a memory, a combined logic circuit, and/or other appropriate components for providing and implementing the above-mentioned functions.

For example, the function of querying, by the Querying unit 501, whether N peripheral device sets contain a first identifier of a first peripheral device and a second identifier of a second peripheral device when a data communication request sent from the first peripheral device to the second peripheral device is detected may be implemented by the mobile terminal as illustrated in FIG. 5. Specifically, an AP 101 may call an executable program code in a memory 102.

It can be seen that the communication method provided in the embodiment of the disclosure is applied to a mobile terminal including N communication processors and an AP. The N communication processors are connected to the AP. Each of the N communication processors is connected to at least two peripheral devices. When a data communication request sent from a first peripheral device to a second peripheral device is detected, it is queried whether N peripheral device sets contain a first identifier of the first peripheral device and a second identifier of the second peripheral device. The N peripheral device sets are associated with the N communication processors respectively, and each peripheral device set contains an identifier of each peripheral device connected to the corresponding communication processor. When it is found out that an $i^{th}$ peripheral device set of the N peripheral device sets contains the first identifier and the second identifier, communication link configuration information carrying an identifier of an $i^{th}$ communication processor associated with the $i^{th}$ peripheral device set is sent to the first peripheral device, so as to instruct the first peripheral device to perform data communication with the second peripheral device via the $i^{th}$ communication processor. As can be seen, a first peripheral device and a second peripheral device located in the same peripheral device set may communicate on the basis of a communication processor associated with the peripheral device set, thereby eliminating a necessity of transferring between all peripheral devices, alleviating burdens on an AP and improving the communication efficiency.

Figure 7:
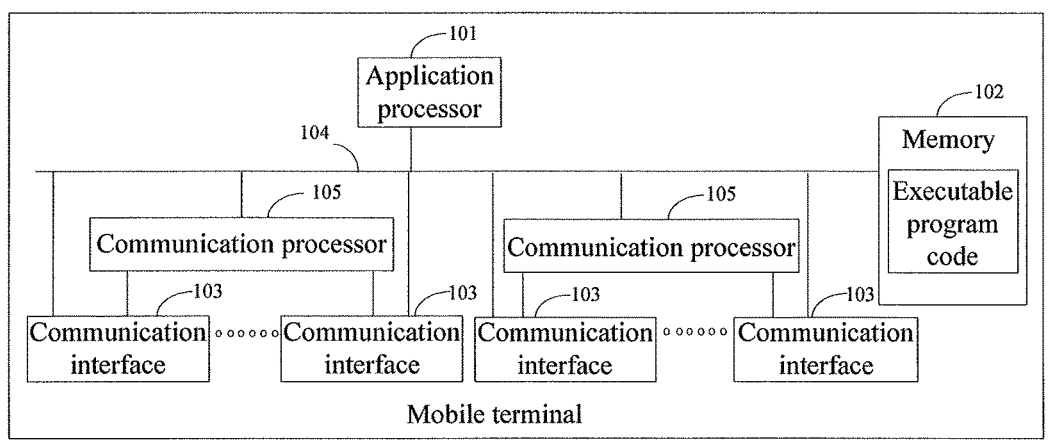
FIG. 7 is a structure diagram illustrating a mobile terminal according to an embodiment of the disclosure.

The embodiment of the disclosure also provides another mobile terminal. The mobile terminal includes N communication processors and an AP 101. Each of the N communication processors are connected to the AP 101. Each of the N communication processors is connected to at least two peripheral devices (e.g., communication interface) of the mobile terminal. N is a positive integer. As illustrated in FIG. 7, the mobile terminal may further include a memory 102, a communication interface 103, a communication processor 105 and a communication bus 104. Here, the AP 101, the memory 102 and the communication interface 103 are connected and complete intercommunication with each other via the communication bus 104. The AP 101 controls wireless communication with an external cellular network via the communication interface 103. The communication interface 103 includes, but not limited to, an antenna, at least one amplifier, a transceiver, a coupler, a Low Noise Amplifier (LNA), a duplexer, etc. The memory 102 may include at least one of a Random Access Memory (RAM), a nonvolatile memory and an external memory. The memory 102 stores an executable program code, and the executable program code can guide the AP 101 to execute the communication method specifically disclosed in the method embodiment of the disclosure.

When a data communication request sent from a first peripheral device to a second peripheral device is detected, the AP 101 queries whether N peripheral device sets contain a first identifier of the first peripheral device and a second identifier of the second peripheral device. The N peripheral device sets are associated with the N communication processors respectively, and each peripheral device set contains an identifier of each peripheral device connected to the corresponding communication processor. The AP 101 is further configured to send, when it is found out that an $i^{th}$ peripheral device set of the N peripheral device sets contains the first identifier and the second identifier, communication link configuration information to the first peripheral device, where i is a positive integer, and 1≤i≤N. The communication link configuration information carries an identifier of an $i^{th}$ communication processor associated with the $i^{th}$ peripheral device set. The communication link configuration information is used to instruct the first peripheral device to perform data communication with the second peripheral device via the $i^{th}$ communication processor.

Optionally, the AP 101 may be further configured to acquire resource occupancy information about the N communication processors, and adjust at least two peripheral devices connected to each of at least some of the N communication processors according to the resource occupancy information on the basis of a load balancing principle, so as to achieve load balancing of the N communication processors via the adjustment.

Optionally, the AP 101 may be further configured to acquire usage information about a target peripheral device within a preset time period; determine a high-frequency usage time period of the target peripheral device according to the usage information about the target peripheral device within the preset time period; and configure, when it is detected that a current time falls within the high-frequency usage time period of the target peripheral device, the target peripheral device with a target communication processor. The processing capacity of the target communication processor is higher than that of other processors, except the target communication processor, of the N communication processors.

Optionally, the AP 101 may be further configured to display a visual interactive interface on a display screen of the mobile terminal, the visual interactive interface being used to set a communication mode for peripheral devices, the visual interactive interface including identifiers of at least two peripheral devices of the mobile terminal and identifiers of the N communication processors; acquire an identifier of a communication processor and an identifier of a peripheral device selected by a user; and add the identifier of the selected peripheral device into a peripheral device set associated with the selected communication processor.

Optionally, the at least two peripheral devices may include, but are not limited to, an RF module, a WIFI module, a power supply, a memory, a camera, a touch screen, an audio playing module, a sensor and a display screen.

Specifically, for specific implementation of various units as described above, reference may be made to the description of relevant operations in the embodiments corresponding to FIGS. 2 to 5, and detailed description will not be made herein.

It can be seen that the communication method provided in the embodiment of the disclosure is applied to a mobile terminal including N communication processors and an AP. The N communication processors are connected to the AP. Each of the N communication processors is connected to at least two peripheral devices. When a data communication request sent from a first peripheral device to a second peripheral device is detected, it is queried whether N peripheral device sets contain a first identifier of the first peripheral device and a second identifier of the second peripheral device. The N peripheral device sets are associated with the N communication processors respectively, and each peripheral device set contains an identifier of each peripheral device connected to the corresponding communication processor. When it is found out that an $i^{th}$ peripheral device set of the N peripheral device sets contains the first identifier and the second identifier, communication link configuration information carrying an identifier of an $i^{th}$ communication processor associated with the $i^{th}$ peripheral device set is sent to the first peripheral device, so as to instruct the first peripheral device to perform data communication with the second peripheral device via the $i^{th}$ communication processor. As can be seen, a first peripheral device and a second peripheral device located in the same peripheral device set may communicate on the basis of a communication processor associated with the peripheral device set, thereby eliminating a necessity of transferring between all peripheral devices, alleviating burdens on an AP and improving the communication efficiency.

Figure 8:
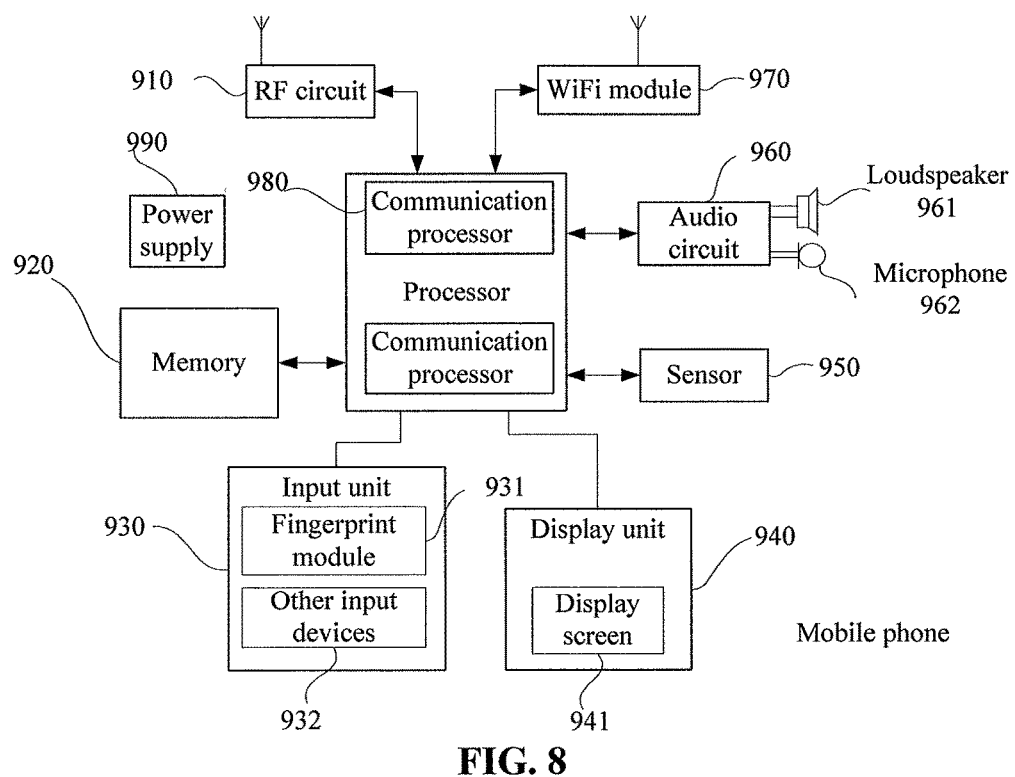
FIG. 8 is a structure diagram illustrating another mobile terminal according to an embodiment of the disclosure.

The embodiments of the disclosure also provide another mobile terminal. As illustrated in FIG. 8, for convenience of description, only parts associated with the embodiments of the disclosure are shown. For specific technical details that are not disclosed, reference may be made to parts of the method in the embodiments of the disclosure. The mobile terminal may be any of terminal devices including a mobile phone, a tablet computer, a Personal Digital Assistant (PDA), a Point of Sales (POS), an on-board computer and the like. A mobile phone is taken as an example of the mobile terminal.

FIG. 8 illustrates a partial structure diagram illustrating a mobile phone associated with a mobile terminal according to an embodiment of the disclosure. As illustrated in FIG. 8, the mobile phone includes an RF circuit 910, a memory 920, an input unit 930, a display unit 940, a sensor 950, an audio circuit 960, a Wireless Fidelity (WiFi) module 970, a processor 980, a power supply 990, and other parts. A person skilled in the art may understand that a mobile phone structure illustrated in FIG. 8 is not intended to limit the mobile phone, and that the mobile phone may include parts more or fewer than those illustrated in the figure, or some parts may be combined, or the mobile phone may have different part arrangements.

Each component of the mobile phone will be specifically described below in conjunction with FIG. 8.

The RF circuit 910 may be configured to receive and transmit information. Usually, the RF circuit 910 includes, but is not limited to, an antenna, at least one amplifier, a transceiver, a coupler, an LNA, a duplexer, etc. In addition, the RF circuit 910 may further communicate with other devices via wireless communication and a network. The wireless communication may use any of communication standards or protocols, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an E-mail, Short Messaging Service (SMS), etc.

The memory 920 may be configured to store a software program and a module. The processor 980 executes various function APPs and data processing of the mobile phone by running the software program and the module stored in the memory 920. The memory 920 may mainly include a storage program region and a storage data region. The storage program region may store an operation system, an APP needed for at least one function (e.g., a program for releasing a dedicated memory resource), etc. The storage data region may store data (e.g., a preset duration) created according to use of the mobile phone. In addition, the memory 920 may include a high-speed RAM, and may further include a non-volatile memory such as a disk storage device, a flash device, or other non-volatile solid storage devices.

The input unit 930 may be configured to receive input digital or character information and generate key signal input associated with user setting and functional control of the mobile phone. Specifically, the input unit 930 may include a fingerprint recognition module 931 and other input devices 932. The fingerprint recognition module 931 may collect fingerprint data of a user thereon. Optionally, the fingerprint recognition module 931 may include an optical fingerprint module, a capacitive fingerprint module and a radio frequency fingerprint module. When the capacitive fingerprint module is taken as an example of the fingerprint recognition module 931, the capacitive fingerprint module specifically include sensing electrodes (including an abnormal sensing electrode and a normal sending electrode) and a signal processing circuit (e.g., an amplifier circuit, a noise suppression circuit, an analog-to-digital conversion circuit, etc.) connected to the sensing electrodes. The input unit 930 may further include, in addition to the fingerprint recognition module 931, other input devices 932. Specifically, the other input devices 932 may include, but are not limited to, one or more of a physical keyboard, a functional key (e.g., a volume control key and a switch key), a track ball, a mouse and an operating rod.

The display unit 940 may be configured to display information input by the user or information provided for the user, and various menus of the mobile phone. The display unit 940 may include a display screen 941. Optionally, the display screen 941 may be configured in a form of a Liquid Crystal Display (LCD), an Organic Light-Emitting Diode (OLED), etc. Although the fingerprint recognition module 931 and the display screen 941, as two independent parts, implement input and function output function of the mobile phone in FIG. 8 respectively, the fingerprint recognition module 931 and the display screen 941 may be integrated to implement the input function and output function of the mobile phone in some embodiments.

The mobile phone may further include at least one sensor 950 such as a light sensor, a motion sensor and other sensors. Specifically, the light sensor may include an ambient light sensor and a proximity sensor. The ambient light sensor may adjust the luminance of the display screen 941 according to the brightness of ambient light. The proximity sensor may close the display screen 941 and/or backlight when the mobile phone is moved to the proximity of an ear. As one of the motion sensors, an accelerometer sensor may detect the magnitude of an accelerated speed in each of directions (generally, three-axis). The accelerometer may detect the amplitude and direction of a gravity while the mobile phone is static. The accelerometer sensor may be further configured to identify an APP of a mobile phone gesture (e.g., switching between a horizontal screen and a vertical screen, relevant games, and magnetometer gesture calibration), and implement vibration-identification-related functions (e.g., pedometer and knocking). Other sensors such as a gyroscope sensor, a barometer sensor, a hygrometer sensor, a thermometer sensor and an infrared sensor configurable for the mobile phone will not be elaborated herein.

The audio circuit 960, a loudspeaker 961 and a microphone 962 may provide an audio interface between the user and the mobile phone. The audio circuit 960 may transmit an electric signal converted from the received audio data to the loudspeaker 961. The loudspeaker 961 converts the electric signal into a sound signal for output. Besides, the microphone 962 converts a collected sound signal into an electric signal. The audio circuit 960 converts the received electric signal into audio data and then outputs the audio data to the processor 980 for processing. The audio data is transmitted to another mobile phone via the RF circuit 910, or the audio data is output to the memory 920 for further processing.

WiFi belongs to a short-range wireless transmission technology. The mobile phone may assist the user in E-mail receiving and sending, webpage browsing, access to streaming media and the like by means of the WiFi module 970. The WiFi module provides a wireless wideband internet access for the user. Although FIG. 8 illustrates the WiFi module 970, it may be understood that the WiFi module 970 does not belong to necessary components of the mobile phone and can be totally omitted without changing the essence of the disclosure as required.

The processor 980 is a control center of the mobile phone. The processor is configured to connect all parts of the whole mobile phone by utilizing various interfaces and lines, to run or execute the software program and/or the module stored in the memory 920, and to call data stored in the memory 820 to execute various functions and processing data of the mobile phone, so as to wholly monitor the mobile phone. Alternatively, the processor 980 may include one or more processing units. Preferably, the processor 980 may be integrated with an application processor and a modulation-demodulation processor. The application processor mainly processes an operation system, a user interface, an application program and the like. The modulation-demodulation processor mainly processes wireless communication. It may be understood that the modulation-demodulation processor may not be integrated into the processor 980.

The mobile phone may further include a power supply 990 (e.g., a battery) for supplying power to each component. Preferably, the power supply may be connected with the logic of processor 980 via a power supply management system, so as to implement functions of charging, discharging and power consumption management by means of the power supply management system.

The mobile phone may further include a camera, a Bluetooth module (not shown) and the like, which will not be elaborated herein.

In the foregoing embodiments illustrated in FIG. 2, FIG. 3, FIG. 4 and FIG. 5, each method flow may be implemented on the basis of the structure of the mobile phone.

In the foregoing embodiments illustrated in FIG. 6-1 and FIG. 6-2, the functions of various unit may be implemented on the basis of the structure of the mobile phone.

The embodiments of the disclosure also provide a computer storage medium. The computer storage medium may store a program. The program, when being executed by a processor, causes the processor to perform operations as illustrated in some or all blocks in any of communication methods in the abovementioned method embodiments.

It is to be noted that for simplifying the description, each of the abovementioned method embodiments is expressed as a series of action combinations. However, a person skilled in the art will understand that the disclosure is not limited by a described action sequence. That is because some operations shown in the blocks may be executed in other sequences or simultaneously according to the disclosure. Secondly, a person skilled in the art will also understand that the embodiments described in the specification fall within preferable embodiments, and involved actions and modules may not be necessary for the disclosure.

In the abovementioned embodiments, descriptions for each embodiment are emphasized respectively, and for parts which are not elaborated in a certain embodiment, reference may be made to relevant descriptions for other embodiments.

In some embodiments provided by the present application, it should be understood that the disclosed apparatus may be implemented in another manner. For example, the apparatus embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection among the various displayed or discussed components may be indirect coupling or communication connection, implemented through some interfaces, of the device or the units, and may be electrical or adopt other forms.

The abovementioned units described as separate parts may or may not be physically separated. The parts displayed as units may or may not be physical units, and namely may be located in the same place, or may be distributed to multiple network units. Part or all of the units may be selected to achieve the purpose of the solutions of the present embodiment according to a practical requirement.

In addition, various function units in each embodiment of the disclosure may be integrated into a processing unit, or the various function units exist physically and independently, or two or more units may be integrated into a unit. The abovementioned integrated unit may be implemented in a form of hardware, or may be implemented in a form of software function unit.

When being implemented in form of software function unit and sold or used as an independent product, the integrated unit may also be stored in a computer-readable storage medium. Based on such an understanding, the technical solutions of the disclosure substantially or parts making contributions to the related art may be embodied in form of software product. The computer software product is stored in a storage medium, and includes a plurality of instructions configured to enable a computer device (which may be a personal computer, a server, a network device or the like) to execute all or part of the method in each embodiment of the disclosure. The abovementioned memory includes various media capable of storing program codes, such as a USB disk, a Read-Only Memory (ROM), an RAM, a mobile hard disk, a magnetic disk or an optical disk.

A person of ordinary skill in the art can understand that all or some operations as illustrated in the blocks in each method in the abovementioned embodiments may be completed by instructing relevant hardware through a program. The program may be stored in a computer-readable memory, and the memory may include a flash disk, an ROM, an RAM, a magnetic disk or an optical disk.

The above is detailed description for the embodiments of the disclosure. The principle and implementations of the disclosure are elaborated herein by adopting specific examples. The description for the abovementioned embodiments are only used to assist in understanding the method of the disclosure and the core idea thereof. Meanwhile, a person of ordinary skill in the art will change a specific implementation manner and an application scope according to the idea of the disclosure. To sum up, the contents of the present specification should not be interpreted as limitations to the disclosure.

The invention claimed is:

1. A communication method, applied to a mobile terminal comprising N communication processors and an Application Processor (AP), the N communication processors being connected to the AP, each of the N communication processors being connected to at least two peripheral devices of the mobile terminal, N being a positive integer, the method comprising:
   when a data communication request sent from a first peripheral device to a second peripheral device is detected, querying whether N peripheral device sets contain a first identifier of the first peripheral device and a second identifier of the second peripheral device, wherein the N peripheral device sets are associated with the N communication processors respectively, and each peripheral device set contains an identifier of each peripheral device connected to the corresponding communication processor; and
   when it is found out that an $i^{th}$ peripheral device set of the N peripheral device sets contains the first identifier and the second identifier, sending communication link configuration information to the first peripheral device, the communication link configuration information carrying an identifier of an $i^{th}$ communication processor associated with the $i^{th}$ peripheral device set, and the communication link configuration information being used to instruct the first peripheral device to perform data communication with the second peripheral device via the $i^{th}$ communication processor, where i is a positive integer, and $1 \le i \le N$.

2. The method according to claim 1, further comprising:
   acquiring resource occupancy information about each of the N communication processors; and
   adjusting at least two peripheral devices connected to each of at least some of the N communication processors according to the resource occupancy information on the basis of a load balancing principle, so as to achieve load balancing of the N communication processors via the adjustment.

3. The method according to claim 2, wherein the adjusting at least two peripheral devices connected to each of at least some of the N communication processors according to the resource occupancy information on the basis of a load balancing principle so as to achieve load balancing of the N communication processors via the adjustment comprises:
   when the resource occupancy information indicates that resource occupancy of a first communication processor of the N communication processors is higher than resource occupancy of other communication processors of the N communication processors, changing connection of one or more of at least two peripheral devices to the first communication processor into connection to other communication processors of the N communication processors on the basis of the load balancing principle.

4. The method according to claim 2, wherein the adjusting at least two peripheral devices connected to each of at least some of the N communication processors according to the resource occupancy information on the basis of a load balancing principle so as to achieve load balancing of the N communication processors via the adjustment comprises:
   when the resource occupancy information indicates that resource occupancy of a second communication processor of the N communication processors is lower than resource occupancy of other communication processors of the N communication processors, changing connection of one or more of at least two peripheral devices to the other communication processors into connection to the second communication processor on the basis of the load balancing principle.

5. The method according to claim 1, further comprising:
determining a high-frequency usage time period of a target peripheral device; and
when it is detected that a current time falls within the high-frequency usage time period of the target peripheral device, configuring the target peripheral device with a target communication processor, processing capacity of the target communication processor being higher than processing capacities of other processors, except the target communication processor, of the N communication processors.

6. The method according to claim 5, wherein the determining a high-frequency usage time period of a target peripheral device comprises:
acquiring usage information about a target peripheral device within a preset time period; and
determining the high-frequency usage time period of the target peripheral device according to the usage information about the target peripheral device within the preset time period.

7. The method according to claim 5, wherein the determining a high-frequency usage time period of a target peripheral device comprises:
performing machine learning on the usage information about the target peripheral device within the preset time period, so as to make statistics on the high-frequency usage time period of the target peripheral device.

8. The method according to claim 1, further comprising:
displaying a visual interactive interface on a display screen of the mobile terminal, the visual interactive interface being used to set a communication mode for peripheral devices, the visual interactive interface comprising identifiers of at least two peripheral devices of the mobile terminal and identifiers of the N communication processors;
acquiring an identifier of a communication processor and an identifier of a peripheral device selected by a user; and
adding the identifier of the selected peripheral device into a peripheral device set associated with the selected communication processor.

9. The method according to claim 1, wherein
the at least two peripheral devices are at least two components selected from a group consisting of a Radio Frequency (RF) module, a Wireless Fidelity (WIFI) module, a power supply, a memory, a camera, a touch screen, an audio playing module, a sensor and a display screen.

10. A mobile terminal, comprising: N communication processors and an Application Processor (AP), the N communication processors being connected to the AP, each of the N communication processors being connected to at least two peripheral devices of the mobile terminal, N being a positive integer, the mobile terminal comprising:
a memory, configured to store instructions readable by one or more processors; and
the one or more processors, configured to execute the instructions to implement one or more units, the one or more units comprising:
a Querying unit, configured to query, when a data communication request sent from a first peripheral device to a second peripheral device is detected, whether N peripheral device sets contain a first identifier of the first peripheral device and a second identifier of the second peripheral device, the N peripheral device sets being associated with the N communication processors respectively, and each peripheral device set containing an identifier of each peripheral device connected to the corresponding communication processor; and
a sending unit, configured to send, when it is found out that an $i^{th}$ peripheral device set of the N peripheral device sets contains the first identifier and the second identifier, communication link configuration information to the first peripheral device, the communication link configuration information carrying an identifier of an $i^{th}$ communication processor associated with the $i^{th}$ peripheral device set, and the communication link configuration information being used to instruct the first peripheral device to perform data communication with the second peripheral device via the $i^{th}$ communication processor, where i is a positive integer, and $1 \leq i \leq N$.

11. The mobile terminal according to claim 10, wherein the one or more processors are further configured to execute the instructions to implement:
a first acquisition unit, configured to acquire resource occupancy information about each of the N communication processors; and
a first configuration unit, configured to adjust at least two peripheral devices connected to each of at least some of the N communication processors according to the resource occupancy information on the basis of a load balancing principle, so as to achieve load balancing of the N communication processors via the adjustment.

12. The mobile terminal according to claim 11, wherein the first configuration unit is configured to:
change, when the resource occupancy information indicates that resource occupancy of a first communication processor of the N communication processors is higher than resource occupancy of other communication processors of the N communication processors, connection of one or more of at least two peripheral devices to the first communication processor into connection to other communication processors of the N communication processors on the basis of the load balancing principle.

13. The mobile terminal according to claim 11, wherein the first configuration unit is configured to:
change, when the resource occupancy information indicates that resource occupancy of a second communication processor of the N communication processors is lower than resource occupancy of other communication processors of the N communication processors, connection of one or more of at least two peripheral devices to the other communication processors into connection to the second communication processor on the basis of the load balancing principle.

14. The mobile terminal according to claim 10, wherein the one or more processors are further configured to execute the instructions to implement:
a determination unit, configured to determine a high-frequency usage time period of a target peripheral device; and
a second configuration unit, configured to configure, when it is detected that a current time falls within the high-frequency usage time period of the target peripheral device, the target peripheral device with a target communication processor, processing capacity of the target communication processor being higher than processing capacities of other processors, except the target communication processor, of the N communication processors.

15. The mobile terminal according to claim 14, wherein the one or more processors are further configured to execute the instructions to implement: a first acquisition unit, configured to acquire usage information about a target peripheral device within a preset time period,
wherein the determination unit is configured to determine the high-frequency usage time period of the target peripheral device according to the usage information about the target peripheral device within the preset time period.

16. The mobile terminal according to claim 15, wherein the first acquisition unit is configured to perform machine learning on the usage information about the target peripheral device within the preset time period; and the determination unit is configured to make statistics on the high-frequency usage time period of the target peripheral device according to a result of the machine learning.

17. The mobile terminal according to claim 10, wherein the one or more processors are further configured to execute the instructions to implement:
a display unit, configured to display a visual interactive interface on a display screen of the mobile terminal, the visual interactive interface being used to set a communication mode for peripheral devices, the visual interactive interface comprising identifiers of at least two peripheral devices of the mobile terminal and identifiers of the N communication processors;
a third acquisition unit, configured to acquire an identifier of a communication processor and an identifier of a peripheral device selected by a user; and
a third configuration unit, configured to add the identifier of the selected peripheral device into a peripheral device set associated with the selected communication processor.

18. The mobile terminal according to claim 10, wherein the at least two peripheral devices are at least two components selected from a group consisting of a Radio Frequency (RF) module, a Wireless Fidelity (WIFI) module, a power supply, a memory, a camera, a touch screen, an audio playing module, a sensor and a display screen.

* * * * *